United States Patent
Gupta et al.

(10) Patent No.: US 10,735,970 B2
(45) Date of Patent: *Aug. 4, 2020

(54) METHOD AND APPARATUS FOR OPERATING A DEVICE ON A LICENSED SPECTRUM AND AN UNLICENSED SPECTRUM

(71) Applicant: Motorola Mobility LLC, Chicago, IL (US)

(72) Inventors: Ranjeet Gupta, Naperville, IL (US); James Van Bosch, Crystal Lake, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/244,088

(22) Filed: Jan. 9, 2019

(65) Prior Publication Data

US 2019/0149999 A1 May 16, 2019

Related U.S. Application Data

(63) Continuation of application No. 15/341,914, filed on Nov. 2, 2016, now Pat. No. 10,219,161.

(51) Int. Cl.
*H04W 16/14* (2009.01)
*H04W 84/12* (2009.01)
*H04W 88/06* (2009.01)

(52) U.S. Cl.
CPC ............ *H04W 16/14* (2013.01); *H04W 84/12* (2013.01); *H04W 88/06* (2013.01)

(58) Field of Classification Search
None
See application file for complete search history.

(56) References Cited

U.S. PATENT DOCUMENTS

| 7,822,438 | B2 * | 10/2010 | Parron ................. H04W 76/19 |
| | | | 455/552.1 |
| 9,432,840 | B2 | 8/2016 | Traynor et al. |
| 10,219,161 | B2 * | 2/2019 | Gupta .................. H04W 16/14 |
| 2004/0165563 | A1 | 8/2004 | Hsu et al. |

(Continued)

OTHER PUBLICATIONS

Huynh, Notice of References Cited, U.S. Appl. No. 15/269,874, U.S. Patent and Trademark Office, filed Jun. 12, 2019.

(Continued)

*Primary Examiner* — Xavier S Wong
(74) *Attorney, Agent, or Firm* — Loppnow & Chapa; Matthew C. Loppnow (57) ABSTRACT

A method and apparatus operate a device on a licensed spectrum and an unlicensed spectrum. The device can operate on a Wireless Wide Area Network (WWAN) channel using a WWAN transceiver via a WWAN Radio Access Technology (RAT) base station using a WWAN RAT. The device can communicate with a WWAN RAT Wireless Local Area Network (WLAN) base station using the WWAN RAT via a WWAN RAT WLAN receiver on a WWAN RAT WLAN channel operating on a WLAN frequency. A personal access point WLAN channel of a WLAN frequency-based personal access point can be selected that provides the least desense of the WWAN RAT WLAN channel on the WWAN RAT WLAN receiver.

20 Claims, 7 Drawing Sheets

(56) References Cited

U.S. PATENT DOCUMENTS

| | | | |
|---|---|---|---|
| 2008/0096565 A1* | 4/2008 | Jin | H04W 36/14 |
| | | | 455/437 |
| 2014/0043979 A1* | 2/2014 | Etemad | H04W 4/70 |
| | | | 370/237 |
| 2015/0223115 A1 | 8/2015 | Liang et al. | |
| 2015/0350988 A1* | 12/2015 | Himayat | H04W 12/04 |
| | | | 370/331 |
| 2015/0365972 A1* | 12/2015 | Seok | H04W 74/0816 |
| | | | 370/336 |
| 2016/0037503 A1* | 2/2016 | Wu | H04W 72/0406 |
| | | | 370/329 |
| 2016/0165604 A1 | 6/2016 | Khawer et al. | |
| 2017/0064727 A1* | 3/2017 | Chrisikos | H04W 72/1231 |
| 2017/0064745 A1 | 3/2017 | Kephart, Jr. et al. | |
| 2017/0164208 A1* | 6/2017 | Nielsen | H04W 28/08 |
| 2017/0280506 A1* | 9/2017 | Kim | H04L 5/0053 |
| 2018/0035438 A1 | 2/2018 | Pao et al. | |

OTHER PUBLICATIONS

Shah, Notice of References Cited, U.S. Appl. No. 15/649,603, U.S. Patent and Trademark Office, filed Jul. 25, 2019.
Shah, Notice of References Cited, U.S. Appl. No. 15/649,603, U.S. Patent and Trademark Office, filed Feb. 7, 2019.
Huynh, Notice of References Cited, U.S. Appl. No. 15/269,874, U.S. Patent and Trademark Office, filed Sep. 25, 2019.

\* cited by examiner

METHOD AND APPARATUS FOR OPERATING A DEVICE ON A LICENSED SPECTRUM AND AN UNLICENSED SPECTRUM

BACKGROUND

1. Field

The present disclosure is directed to a method and apparatus for operating a device on a licensed spectrum and an unlicensed spectrum. More particularly, the present disclosure is directed to operating a device on a licensed spectrum and an unlicensed spectrum using the same radio access technology.

2. Introduction

Presently, people use wireless communication devices to make calls, read electronic mail, surf the Internet, stream movies, download files, connect to other devices, and perform other wireless communication actions. Wireless communication devices include smartphones, cellular phones, laptop computers, tablet computers, connected home devices, televisions, set top boxes, and other wireless communication devices. Many of these devices can send and receive data on multiple radio access technologies, such as cellular, Long Term Evolution (LTE), IEEE 802.11 (Wi-Fi), IEEE 802.15.1 (Bluetooth), and other radio access technologies. LTE and other carrier grade services operate on licensed frequency bands. IEEE 802.11 services, such as for a Wireless Local Area Network (WLAN), operate on both 2.4 GHz and 5 GHz unlicensed frequency bands.

LTE Advanced is a radio access technology that has been proposed for providing carrier-grade wireless service in the 5 GHz, unlicensed band. Until today, IEEE 802.11 has been the most popular choice for radio access in the unlicensed space. However, wireless wide area network, such as LTE, technology, originally envisioned for cellular operation only in licensed bands, has significant performance gains over Wi-Fi when operating in the unlicensed band. Some advantages of LTE Advanced include better and more reliable links, better performance, better efficiency in Medium Access Control (MAC), better wireless communication device management, and excellent coverage. Unfortunately, because LTE Advanced operates in the same 5 GHz unlicensed band as IEEE 802.11, there are problems with conflicts between the two radio access technologies.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

DETAILED DESCRIPTION

Embodiments provide a method and apparatus for operating a device on a licensed spectrum and an unlicensed spectrum. According to a possible embodiment, the device can operate on a Wireless Wide Area Network (WWAN) channel using a WWAN transceiver via a WWAN Radio Access Technology (RAT) base station using a WWAN RAT. The device can communicate with a WWAN RAT Wireless Local Area Network (WLAN) base station using the WWAN RAT via a WWAN RAT WLAN receiver on a WWAN RAT WLAN channel operating on a WLAN frequency. Activation of WLAN frequency-based personal access point using a WLAN personal access point transceiver on the device can be detected. A personal access point WLAN channel of the WLAN frequency-based personal access point can be selected that provides the least desense of the WWAN RAT WLAN channel on the WWAN RAT WLAN receiver.

Figure 1:
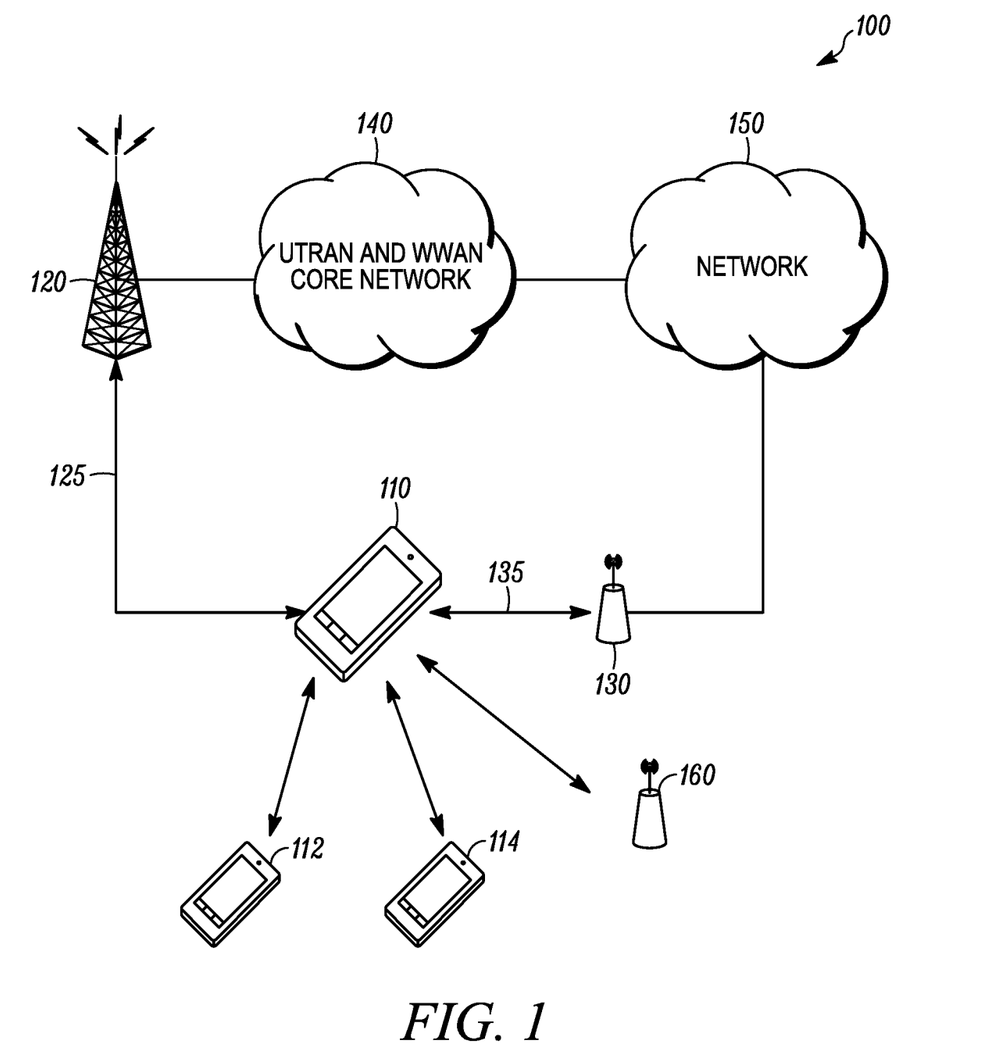
FIG. 1 is an example block diagram of a system according to a possible embodiment.

FIG. 1 is an example block diagram of a system 100 according to a possible embodiment. The system 100 can include a wireless communication devices 110, 112, and 114, a wireless wide area network base station 120 that uses a wireless wide area network radio access technology, a wireless local area network base station 130 that also uses the wireless wide area network radio access technology, a Universal Terrestrial Radio Access Network (UTRAN) and wireless wide area network core network 140, and a global network 150 that can include a plurality of networks. Each of the wireless communication devices 110, 112, and 114 can be user equipment, a wireless terminal, a portable wireless communication device, a smartphone, a cellular telephone, a flip phone, a personal digital assistant, a device having a subscriber identity module, a personal computer, a selective call receiver, a tablet computer, a laptop computer, or any other device that is capable of sending and receiving communication signals on a wireless network.

The wireless wide area network base station 120 can also be considered a WWAN RAT base station, a Long Term Evolution (LTE) base station, an enhanced NodeB (eNodeB or eNB), a base station that uses licensed cellular frequencies, or any other wireless wide area network base station. The wireless local area network base station 130 that also uses the wireless wide area network radio access technology can also be considered a WWAN RAT WLAN base station, a wireless wide area communication network advanced access point, an LTE Advanced eNodeB, an LTE-U base station, or any other base station or access point that operates on unlicensed frequencies, such as the 5 GHz spectrum, using a WWAN RAT. For example, the wireless local area network base station 130 that uses the wireless wide area network radio access technology can be considered a WWAN RAT WLAN because it uses the same WWAN RAT as the WWAN RAT base station 120 while operating on WLAN frequencies.

In operation, the device 110 can communicate with both the WWAN base station 120 and the WWAN RAT WLAN base station 130 using the same WWAN RAT. For example, the device 110 can operate using an LTE Advanced radio access technology by communicating with the wireless wide area network base station 120 using a licensed band/frequency such as LTE band 4, and can communicate with the wireless local area network base station 130 using a 5 GHz unlicensed band/frequency, such as LTE band 255, for LTE Advanced communication. When communicating with both base stations 120 and 130, the device 110 can receive carrier aggregated data from both base stations 120 and 130 or can individually receive data from one of or each base station 120 and 130. When communicating with the WWAN RAT WLAN base station 130 using LTE band 255, the device 110 may not be connected to an 802.11 access point 160 to avoid signal interference because both radio access technologies can operate in the 5 GHz unlicensed band.

LTE Advanced radio access technologies can include License Assisted Access (LAA), LTE—Wi-Fi Aggregation (LWA), and MulteFire, LTE in Unlicensed spectrum (LTE-U), and other wireless wide area network advanced radio access technologies that provide for communication on both a wireless wide area network and a wireless local area network. These radio access technologies may require that the device 110 operates on a corresponding wireless local area network base station 130 using a clean channel. According to a possible embodiment, an uplink channel, such as a paging channel, and a signaling channel can be on an LTE licensed channel, while received data can be on one or on both of a licensed channel and an unlicensed 5 GHz spectrum channel.

The wireless communication device 110 can also communicate with the other wireless communication devices 112 and 114. For example, the wireless communication device can operate as a WLAN frequency-based personal access point, such as a personal access point, a Mobile Hotspot (MHS), a Peer-to-Peer Group Owner (P2P-GO), or other personal access point. When operating as a personal access point, the wireless communication device 110 can provide access for the wireless communication devices 112 and 114 to the networks 140 and/or 150, to each other, and to other wireless communication devices. As a more particular example, the wireless communication device 110 can act as a private hotspot, similar to an 802.11 router, using at least one WLAN frequency channel to provide access to the Internet for wireless communication devices 112 and 114 via the wireless wide area network base station 120. As another more particular example, the wireless communication device 110 can act as a P2P-GO, such as a Wi-Fi Direct Group Owner, using at least one WLAN frequency channel and assume the traditional role of an access point. Then, the other wireless communication devices 112 and 114 can connect to the wireless communication device 110 using a WLAN frequency channel as clients in station mode.

Figure 2:
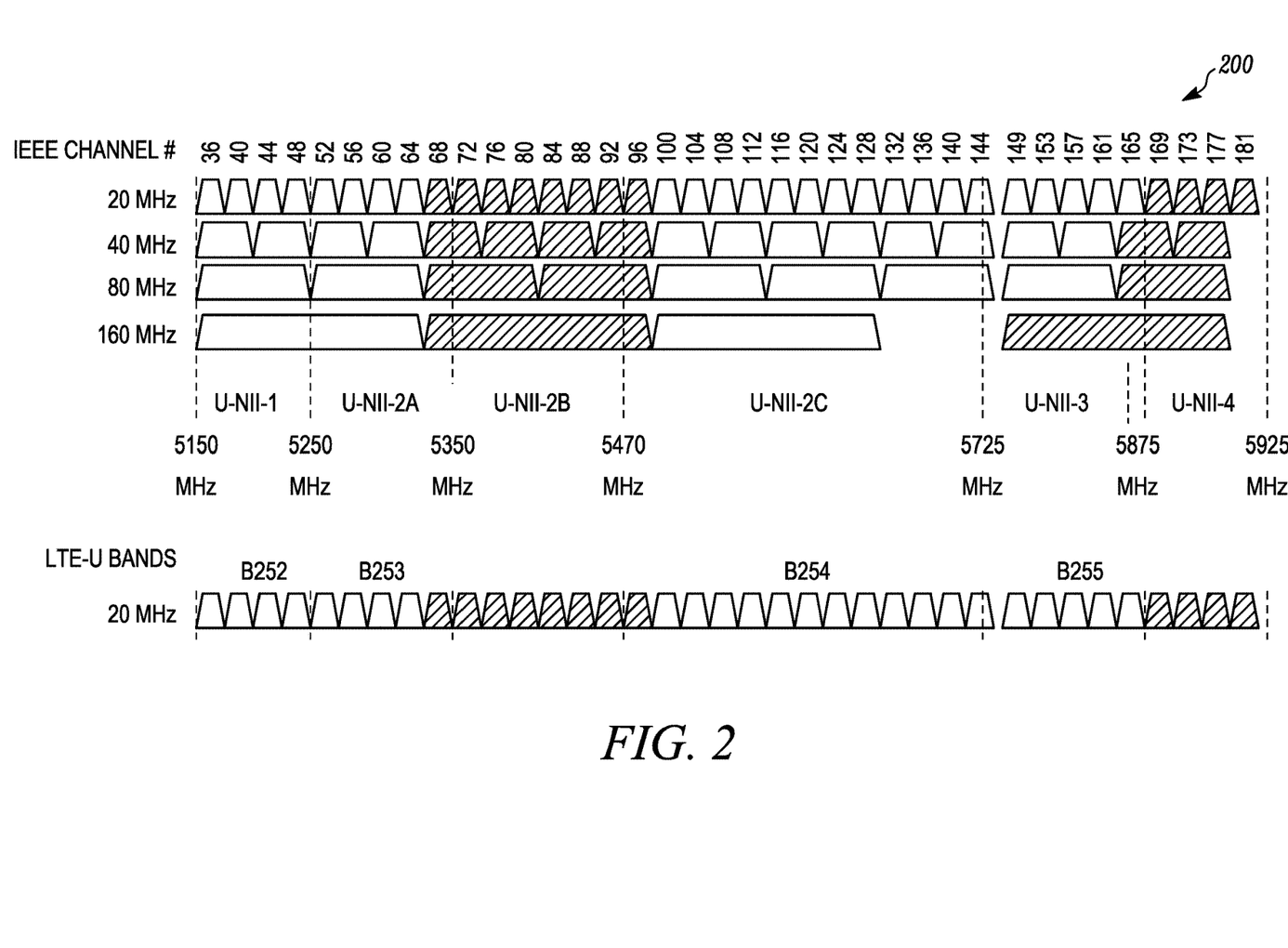
FIG. 2 is an example illustration of Unlicensed National Information Infrastructure bands according to a possible embodiment.

FIG. 2 is an example illustration of Unlicensed National Information Infrastructure (U-NII) bands U-NII-1 through U-NII-4 in the unlicensed 5 GHz spectrum 200 ranging from 5,150 MHz through 6,925 MHz according to a possible embodiment. Various IEEE 802.11 channels ranging from 36-181 can operate in the 5 GHz spectrum. These channels can be combined to have bandwidths of 20 MHz, 40 MHz, 80 MHz, and 160 MHz. LTE Advanced can also operate in the 5 GHz spectrum. For example, LTE-U bands B252, B253, B254, and B255 can operate in the 5 GHz spectrum and additional bands can be added. Initial deployments of LTE-U can support bands B252 and B255, while bands B253 and B254 can be in the Dynamic Frequency Selection (DFS) spectrum. Within each LTE-U band, there can be multiple 20 MHz wide channels that can be used.

Referring back to FIG. 1, a downlink in a communication signal 135 from the WWAN RAT WLAN base station 130 operating in the 5 GHz spectrum in the system 100 can supplement a downlink in a communication signal 125 from the WWAN base station 120 for carrier aggregation using different scenarios. Carrier Aggregation (CA) can be done to boost wireless wide area network data throughput under different wireless wide area network band combinations for supplemental downlink reception.

TABLE 1

LTE-U supplemental downlink carrier aggregation scenarios

| # | Band Combination | Licensed Band | Unlicensed Band | BW (MHz) | CA Configuration |
|---|---|---|---|---|---|
| 1 | B13 + B252 + B252 | B13 | U-NII-1 | 10 + 20 + 20 | inter-band + unlicensed |
|   | B13 + B255 + B255 | B13 | U-NII-3 | 10 + 20 + 20 | intra-band contiguous DL CA w/o UL CA |
| 2 | B13 + B252 | B13 | U-NII-1 | 10 + 20 | inter-band DL CA without |
|   | B13 + B255 | B13 | U-NII-3 | 10 + 20 | UL CA |
| 3 | B2 + B252 + B252 | B2 | U-NII-1 | [5, 10, 15, 20] + 20 + 20 | inter-band + unlicensed |
|   | B2 + B255 + B255 | B2 | U-NII-3 | [5, 10, 15, 20] + 20 + 20 | intra-band contiguous DL CA w/o UL CA |
| 4 | B2 + B252 | B2 | U-NII-1 | [5, 10, 15, 20] + 20 | inter-band DL CA without |
|   | B2 + B255 | B2 | U-NII-3 | [5, 10, 15, 20] + 20 | UL CA |
| 5 | B4 + B252 + B252 | B4 | U-NII-1 | [5, 10, 15, 20] + 20 + 20 | inter-band + unlicensed |
|   | B4 + B255 + B255 | B4 | U-NII-3 | [5, 10, 15, 20] + 20 + 20 | intra-band contiguous DL CA w/o UL CA |
| 6 | B4 + B252 | B4 | U-NII-1 | [5, 10, 15, 20] + 20 | inter-band DL CA without |
|   | B4 + B255 | B4 | U-NII-3 | | UL CA |

As shown in Table 1, the LTE and LTE-U Operating bands for carrier aggregation can be with LTE bands B2/B4/B13 and LTE-U bands B252/B255. The other LTE bands may or may not be used for carrier aggregation. The LTE and LTE-U aggregation can be for 20 MHz wide channels, where initial deployments can be for scenarios 2, 4, and 6 in Table 1.

For LTE Advanced, such as LTE-U, deployment methodology, factors including deployment layout, channel model, available spectrum, and other factors can be considered for coexistence performance between 802.11 and LTE-U systems, as well as between different LTE-U nodes, such as LTE-U base stations. For example, when LTE is simply deployed in unlicensed spectrum without any coexistence mechanism, LTE can cause performance degradation on coexisting neighbor 802.11 systems. Managing the coexistence of Wi-Fi and LTE-U can mitigate performance degradation for deployment of the LTE-U supported access points, such as wireless local area network base stations that use wireless wide area network radio access technology, in a wireless medium environment with 802.11. Methods to solve 802.11 and LTE-U coexistence can include Carrier Sense Adaptive Transmission (CSAT), channel selection, Opportunistic Supplemental Downlink (OSDL), and Listen Before Talk (LBT).

Figure 3:
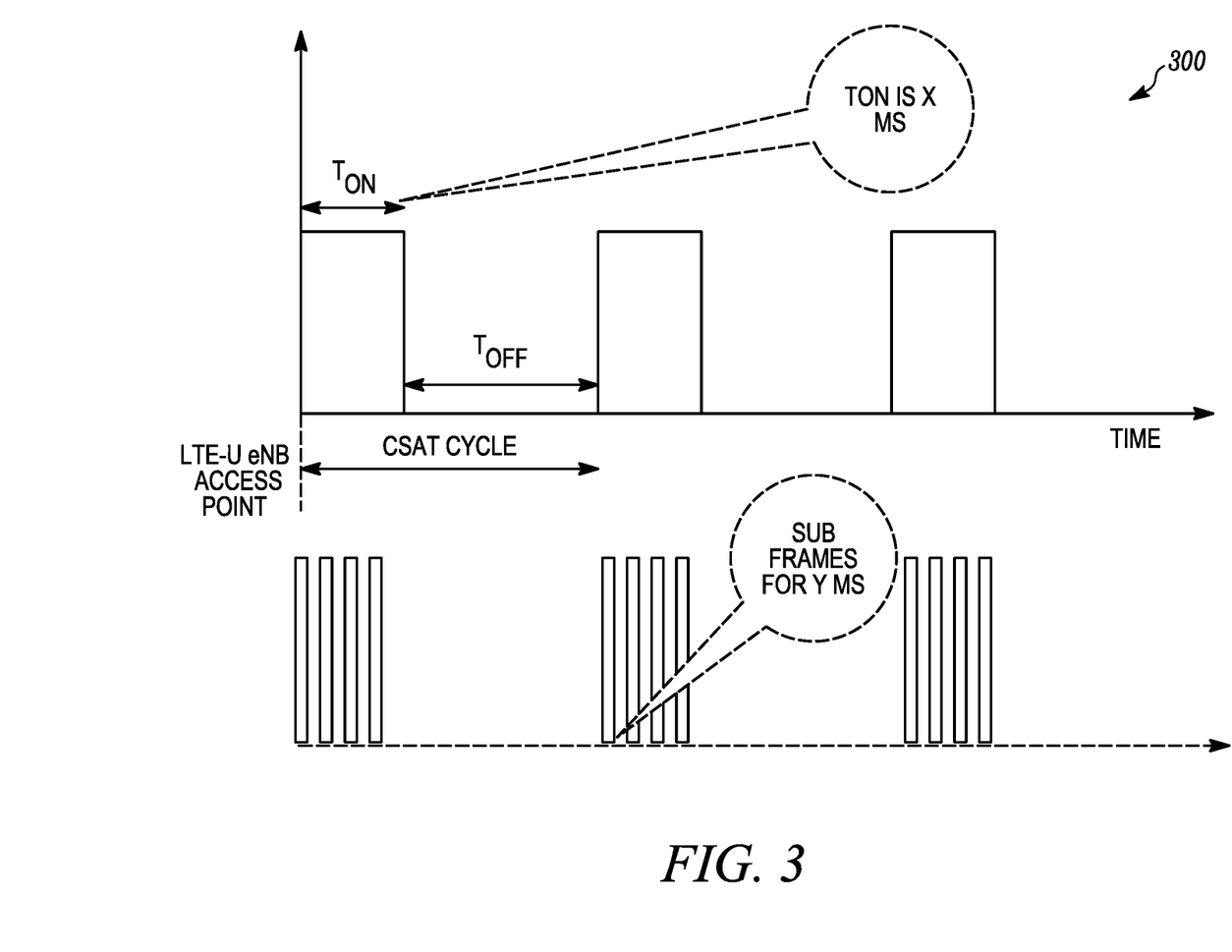
FIG. 3 is an example illustration of carrier sense adaptive transmission according to a possible embodiment.

FIG. 3 is an example illustration 300 of CSAT according to a possible embodiment. With CSAT, communication in unlicensed spectrum can be used to avoid and mitigate the interference between radio access technologies to use unlicensed 5 GHz spectrum for transmission, based on Time Division Multiplexing (TDM) communication patterns, which can be done periodically, where time slots up to 20-50 msec can be reserved for mobile operators, such as wireless wide area network operators. The CSAT cycle can be X ms apart, which can be repeated periodically. $T_{ON}$ can be the duration when a LTE base station can transmit the data to a wireless communication device for aggregation. $T_{OFF}$ can be the duration when the LTE base station may not transmit any data to device. For latency sensitive application such as Voice over Wi-Fi Calling (VoWFC) the $T_{ON}$ can be divided into sub frames for Y ms. X ms and Y ms can be configured by a mobile, such as LTE, operator and dynamically changed based on the interference and data load. The value of X and Y in the CSAT cycle can be dynamic and can be configured at run time by the operator, which may or may not bring down the whole throughput of the network.

For the channel selection solution for coexistence, the cleanest channel in general can be chosen where 802.11 primary channels can be avoided, channels occupied by other LTE-U operators can be avoided, and the channel occupied by the same LTE-U operator can be chosen. The channel selection can further be based on network operator decisions. For the OSDL solution for coexistence, data transmissions can be avoided if there is a small amount of traffic. For example, if the data activity for the LTE usage is below certain threshold, then the LTE-U CSAT cycle can be shut down and legacy behavior can be used.

CSAT polling can be of a fixed duration, while LBT can be dynamic. For example, in LBT, a radio transceiver can first sense, such as listen to, a channel before it starts a transmission. If a selected channel is busy, the radio transceiver can wait until the channel is free. If the channel is not busy, the radio transceiver can start the transmission.

Figure 4:
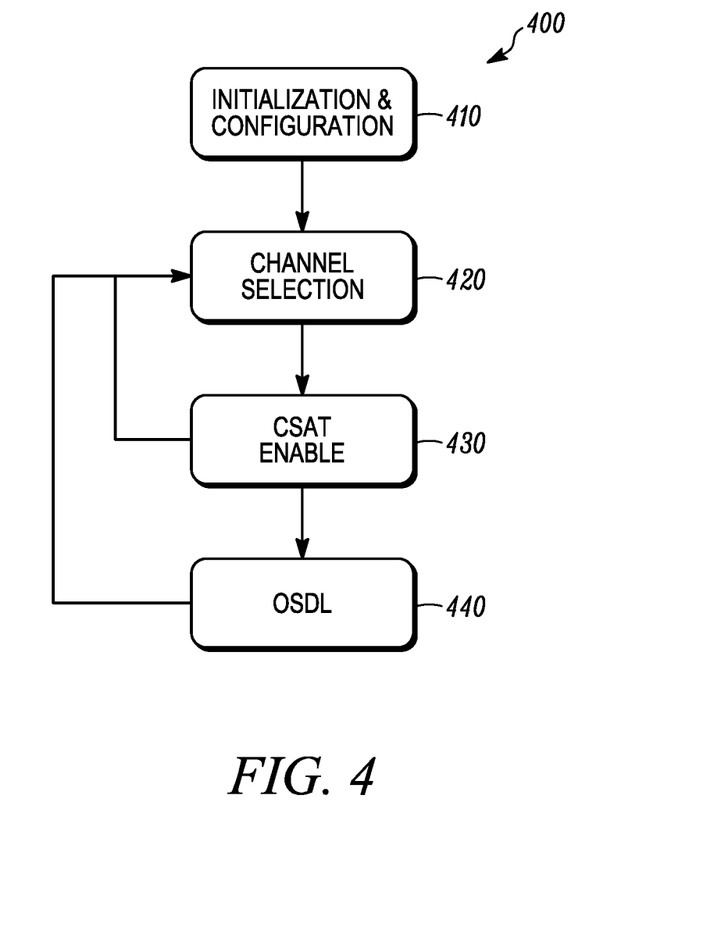
FIG. 4 is an example state diagram for LTE-U coexistence according to a possible embodiment.

FIG. 4 is an example state diagram 400 for LTE-U coexistence according to a possible embodiment. At 410, coexistence initiation and configuration can be administered by the mobile operator. At 420, channel selection can be performed. The channel selection algorithm can be specific to the vendor that provided the chip for the LTE-U access point/base station. At 430, then CSAT can be enabled and the CSAT duty cycle can be controlled based on the traffic and load on the network. At 440, OSDL can shut off the LTE-U completely when the system identifies the data quantity to be transmitted on LTE-U band is less.

Figure 5:
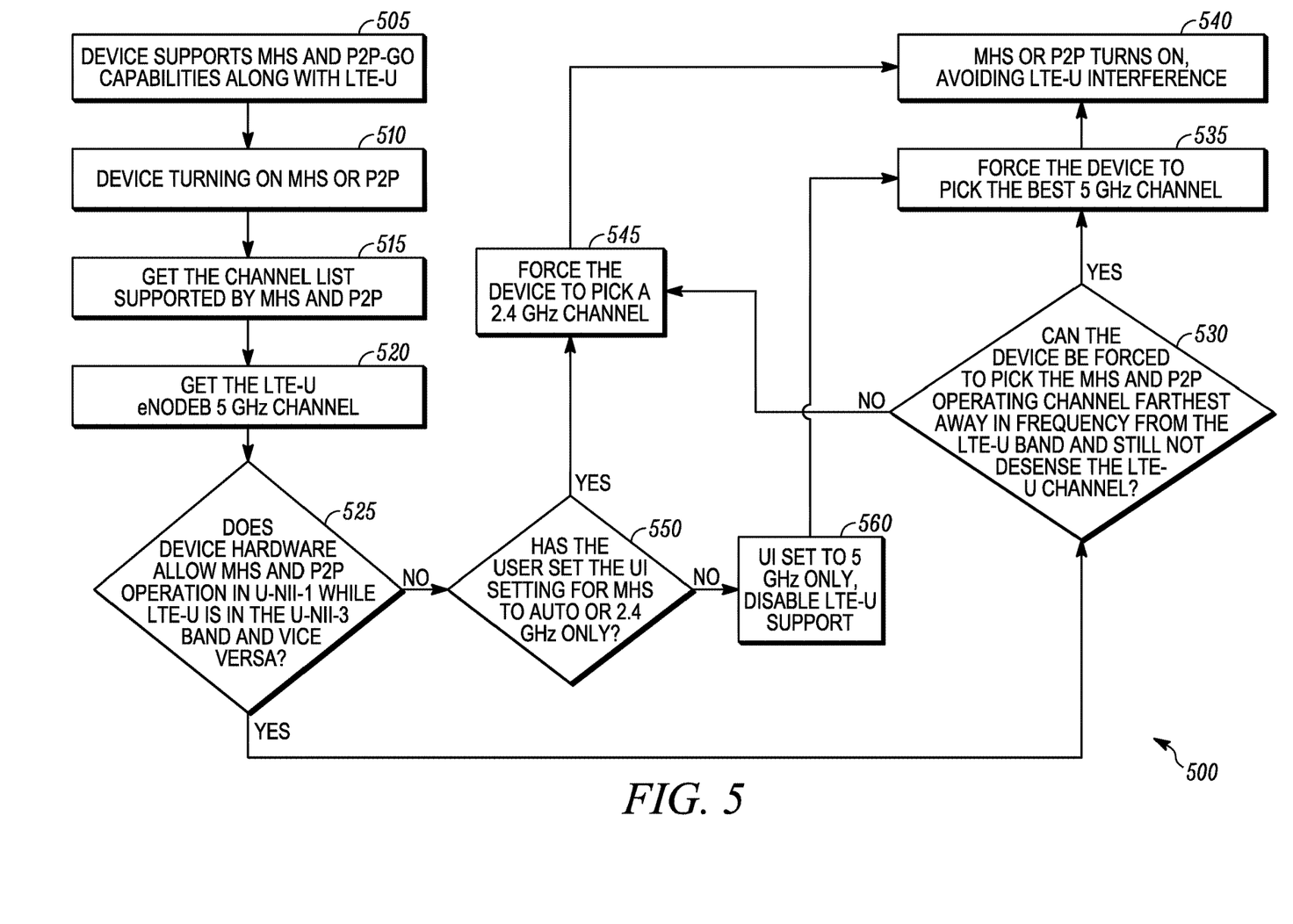
FIG. 5 is an example flowchart illustrating the operation of a wireless communication device according to a possible embodiment.

FIG. 5 is an example flowchart 500 illustrating the operation of a wireless communication device, such as the device 110, according to a possible embodiment. Referring to FIG. 1, the device 110 can use LTE Advanced, such as LTE in Unlicensed spectrum (LTE-U), to access the WWAN RAT WLAN base station 130. The device 110 can receive data on a LTE-U band 252/253/254/255 from the WWAN RAT WLAN base station 130 and send corresponding acknowledgement (ACK) packets to the WWAN base station 120 on a LTE band 2/4/13. According to other implementations of LTE Advanced, such as LAA, LWA, and MulteFire, the download and upload transmissions can be on the same band, where reception and transmission can use the same LTE Advanced band. When the device 110 as a WLAN frequency-based personal access point, such as a personal access point, a Mobile Hotspot (MHS), a Peer-to-Peer Group Owner (P2P-GO), or other personal access point and uses a 5 GHz channel that coincides with 5 GHz WWAN RAT WLAN, such as LTE-U, channels, the device can desense the LTE-U channel when it transmits on a 5 GHz personal access point channel, which can hinder the ability to receive the LTE-U signal. Embodiments can improve operation of the device 110 when it acts as a personal access point.

Referring back to FIG. 5, at 505, the device 110 can support a personal access point, such as MHS and/or P2P-GO capabilities along with LTE-U capability. At 510, the device 110 can turn on the personal access point, such as MHS or P2P. At 515, the device 110 can get the channel list supported by the personal access point. At 520, the device 110 can get LTE-U eNodeB 5 GHz channel. At 525, an optional determination can be made as to whether the device hardware allows personal access point operation in U-NII-1 while LTE-U is in the U-NII-3 band and vice versa. If yes, then optionally at 530, a determination can be made as to whether the device 110 can be forced to pick the MHS and P2P operating channel farthest away in frequency from the LTE-U band and still not desense the LTE-U channel. If yes, at 535, the device 110 can be forced to pick the best 5 GHz channel. At 540, the personal access point can turn on while avoiding LTE-U interference. If at 530, the determination is no, at 545, the device 110 can be forced to pick a 2.4 GHz channel for the personal access point. If at 525, the determination is no, at 550, a determination can be made as to whether the user has set the user interface settings for the personal access point to automatic or 2.4 GHz operation only. If yes, at 545, the device 110 can be forced to pick a 2.4 GHz channel for the personal access point. If at 550, the determination is no, at 560, the user interface has been set to 5 GHz and LTE-U support can be disabled and at 535 the device can pick a 5 GHz channel for personal access point operation.

Figure 6:
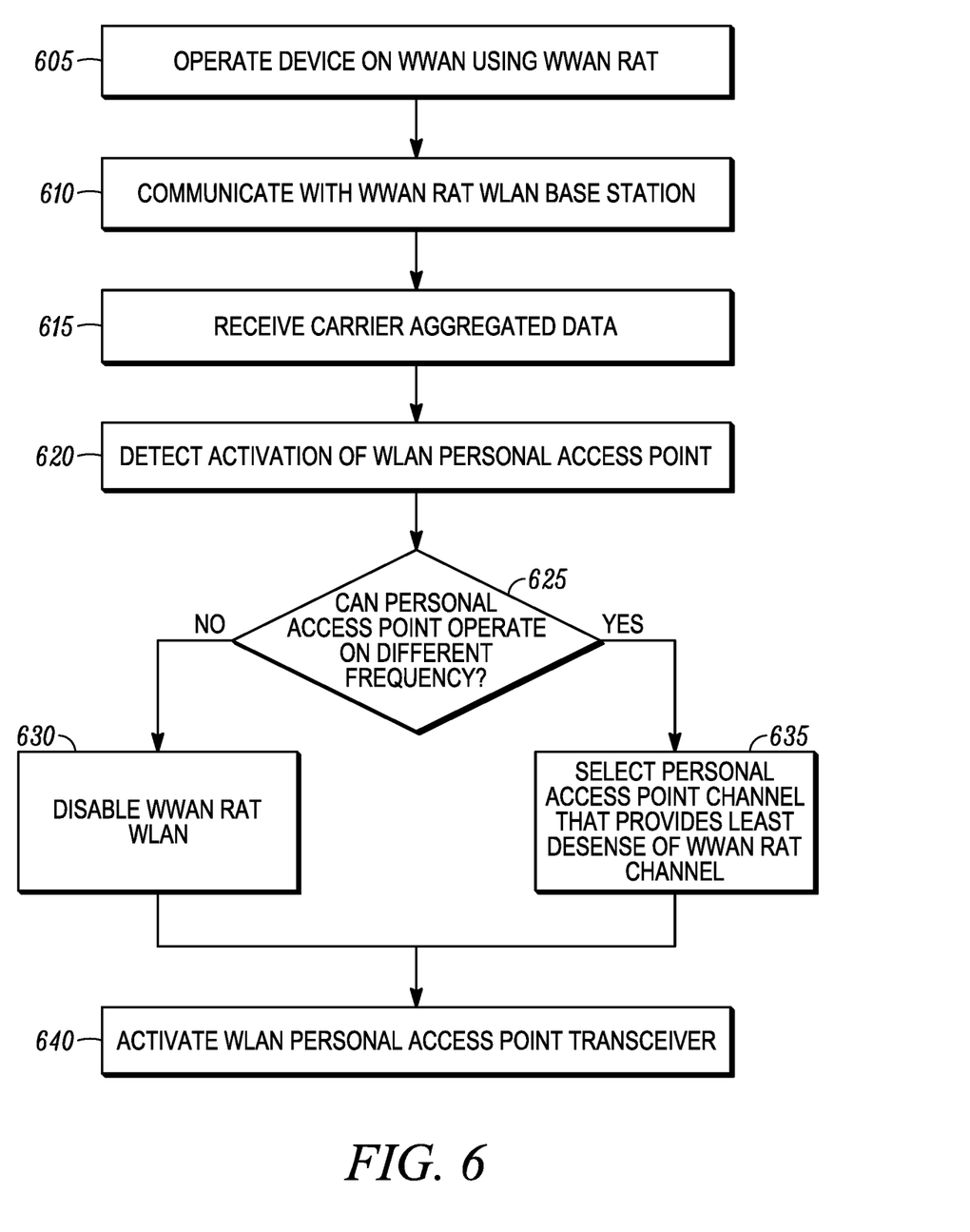
FIG. 6 is an example flowchart illustrating the operation of a wireless communication device according to a possible embodiment.

FIG. 6 is an example flowchart 600 illustrating the operation of a wireless communication device, such as the device 110, according to a possible embodiment. At 605, the device can operate on a WWAN channel using a WWAN transceiver via a WWAN RAT base station using a WWAN RAT. The WWAN base station can be a cellular base station, an LTE base station, a licensed frequency base station, an eNodeB, and/or any other WWAN base station using a corresponding wireless technology channel. The WWAN RAT can be a LTE-based RAT, can be a IEEE 802.16m RAT, or any other WWAN RAT, such as a RAT common to a given cellular and/or WWAN service provider. Other RATs can include WLAN RATS, such as 802.11 RATs, can include 802.15 RATs, and can include other RATs.

At 610, the device can communicate with a WWAN RAT WLAN base station using the WWAN RAT via a WWAN RAT WLAN receiver on a WWAN RAT WLAN channel operating on a WLAN frequency. The WWAN RAT WLAN receiver can be part of a transceiver. The WLAN frequency that the WWAN RAT WLAN base station operates on can be part of a plurality of WLAN frequencies that overlap with WLAN frequencies of the 802.11 RAT. For example, the channel on the WLAN frequency can be a channel in frequencies for IEEE.802.11 channels 36-181 corresponding to LTE-U U-NII-1 through U-NII-4, as well as other similar frequencies.

At 615, carrier aggregated data can be received on a combination of the WWAN channel and the WWAN RAT WLAN channel when communicating with the WWAN RAT WLAN base station and the WWAN base station. Information can also just be communicated on one or the other of the WWAN RAT WLAN and WWAN channels/base stations.

At 620, the device can detect activation of WLAN frequency-based personal access point that uses a WLAN personal access point transceiver on the device. A WLAN frequency-based personal access point, such as a personal access point, can be a MHS of the device, P2P-GO operation of the device, and/or any other WLAN frequency-based network personal access point feature of a device. An WLAN frequency-based network personal access point can be hardware, can be software, or can be a combination of hardware and software on the device.

At 625, a determination can be made as to whether the WLAN frequency-based personal access point can operate on a frequency outside of WWAN RAT WLAN channel frequencies. If the WLAN frequency-based personal access point cannot operate on a frequency outside of WWAN RAT WLAN channel frequencies, at 630, communication with the WWAN RAT WLAN base station can be disabled. For example, the WLAN frequency-based network personal access point can be set to 5 GHz and the WLAN RAT WLAN communication can be shut off.

If the WLAN frequency-based personal access point can operate on a frequency outside of WWAN RAT WLAN channel frequencies, at 635, a personal access point WLAN channel of the WLAN frequency-based personal access point can be selected that provides the least desense of the WWAN RAT WLAN channel on the WWAN RAT WLAN receiver. Desense can be the degradation in receiver sensitivity due to noise sources located in the device. In this case, when a personal access point, such as MHS or P2P, is transmitting on a 5 GHz channel, it can degrade the receiver sensitivity of the WWAN RAT WLAN receiver, such as a LTE-U, LAA, or other WWAN RAT WLAN receiver, that operates on a WWAN RAT WLAN channel in a 5 GHz band due to the limited frequency separation of the signals and the limited antenna isolation available in the device. This degradation can reduce the Signal-to-Noise Ratio (SNR) in the device and degrade its performance. As another example, when the WWAN RAT WLAN transceiver is transmitting it can degrade, such as desense, a WLAN frequency-based receiver being used for the personal access point connection.

According to a possible embodiment, a 2.4 GHz band channel can be selected as a personal access point WLAN channel of the WLAN frequency-based network personal access point that provides the least desense of the WWAN RAT WLAN channel on the WWAN RAT WLAN receiver. According to another possible embodiment, an available 5 GHz band channel that is farthest away from the WWAN RAT WLAN channel in the 5 GHz band can be selected as the personal access point WLAN channel of the WLAN frequency-based network personal access point that provides the least desense of the WWAN RAT WLAN channel on the WWAN RAT WLAN receiver. At 640, the WLAN personal access point transceiver using the selected personal access point WLAN channel can be activated.

According to a possible implementation the WWAN can be a LTE-based network and the personal access point WLAN channel can be an 802.11 channel According to another possible implementation, the WLAN frequency can be a frequency in a range of 4,915 MHz to 5,925 MHz. According to a further possible implementation, the WWAN RAT WLAN base station using the WWAN RAT and the WWAN base station using the WWAN RAT can be base stations of a same service provider.

Figure 7:
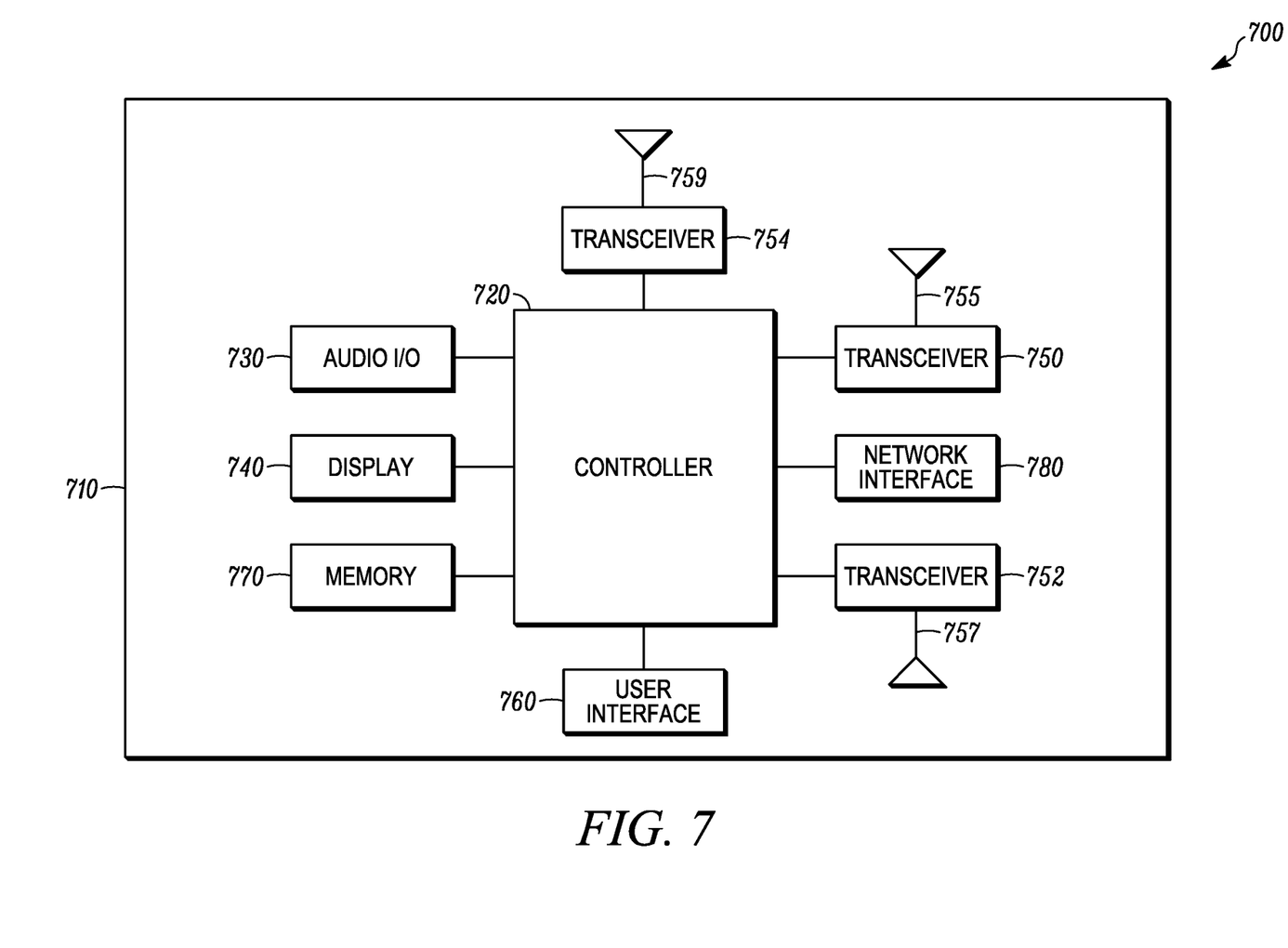
FIG. 7 is an example block diagram of an apparatus according to a possible embodiment.

FIG. 7 is an example block diagram of a device 700, such as the wireless communication device 110, according to a possible embodiment. The device 700 can include a housing 710, a controller 720 within the housing 710, audio input and output circuitry 730 coupled to the controller 720, a display 740 coupled to the controller 720, a first transceiver 750 coupled to the controller 720, an antenna 755 coupled to the first transceiver 750, a second transceiver 752 coupled to the controller 720, an antenna 757 coupled to the second transceiver 752, a third transceiver 754 coupled to the controller 720, a third antenna 759 coupled to the third transceiver 754, a user interface 760 coupled to the controller 720, a memory 770 coupled to the controller 720, and a network interface 780 coupled to the controller 720. The device 700 can perform the methods described in all the embodiments.

The display 740 can be a viewfinder, a liquid crystal display (LCD), a light emitting diode (LED) display, a plasma display, a projection display, a touch screen, or any other device that displays information. The first, second, and third transceivers 750, 752, and 754 can each include a transmitter and/or a receiver. The audio input and output circuitry 730 can include a microphone, a speaker, a transducer, or any other audio input and output circuitry. The user interface 760 can include a keypad, a keyboard, buttons, a touch pad, a joystick, a touch screen display, another additional display, or any other device useful for providing an interface between a user and an electronic device. The network interface 780 can be a Universal Serial Bus (USB) port, an Ethernet port, an infrared transmitter/receiver, an IEEE 1394 port, a WLAN transceiver, or any other interface that can connect a device to a network, device, or computer and that can transmit and receive data communication signals. The memory 770 can include a random access memory, a read only memory, an optical memory, a flash memory, a removable memory, a hard drive, a cache, or any other memory that can be coupled to a device.

The device 700 or the controller 720 may implement any operating system, such as Microsoft Windows®, UNIX®, or LINUX®, Android™, or any other operating system. Device operation software may be written in any programming language, such as C, C++, Java or Visual Basic, for example. Device software may also run on an application framework, such as, for example, a Java® framework, a .NET® framework, or any other application framework. The software and/or the operating system may be stored in the memory 770 or elsewhere on the device 700. The device 700 or the controller 720 may also use hardware to implement disclosed operations. For example, the controller 720 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 720 may be any controller or processor device or devices capable of operating a device and implementing the disclosed embodiments.

In operation, the first transceiver 750 can be a WWAN transceiver that can operate the device 700 on a WWAN channel via a WWAN RAT base station using a WWAN RAT. The second transceiver 752 can be at least a WWAN RAT WLAN receiver that can communicate with a WWAN RAT WLAN base station using the WWAN RAT on a WWAN RAT WLAN channel operating on a WLAN frequency. The WWAN RAT WLAN receiver 752 can communicate with the WWAN RAT WLAN base station by receiving carrier aggregated data by aggregating data received via the WWAN RAT WLAN receiver 752 and on the WWAN RAT WLAN channel with data received via the WWAN transceiver 750 on the WWAN channel. The third transceiver 754 can be a WLAN personal access point transceiver, that can act as a P2P transceiver, can act as a MHS transceiver, can act as a client transceiver in a P2P network, can connect to a WLAN access point, can connect to another WLAN personal access point transceiver, can be an 802.11 transceiver, can provide access to a WLAN, and can perform other operations as a WLAN transceiver.

The controller 720 can detect activation of WLAN frequency-based personal access point that uses the WLAN personal access point transceiver 754 on the device. The controller 720 can select a personal access point WLAN channel of the WLAN frequency-based personal access point that provides the least desense of the WWAN RAT WLAN channel on the WWAN RAT WLAN receiver 752. The controller 720 can select a personal access point WLAN channel of the WLAN frequency-based network personal access point that provides the least desense of the WWAN RAT WLAN channel on the WWAN RAT WLAN receiver 752 by selecting a 2.4 GHz band channel as the personal access point WLAN channel. The controller 720 can also select a personal access point WLAN channel of the WLAN frequency-based network personal access point that provides the least desense of the WWAN RAT WLAN channel on the WWAN RAT WLAN receiver 752 by selecting an available 5 GHz band channel as the personal access point WLAN channel that is farthest away from the WWAN RAT WLAN channel in the 5 GHz band.

The controller 720 can also determine whether the WLAN frequency-based personal access point can operate on a frequency outside of WWAN RAT WLAN channel frequencies and can disable communication with the WWAN RAT WLAN base station when the WLAN frequency-based personal access point cannot operate on a frequency outside of WWAN RAT WLAN channel frequencies. The controller 720 can additionally determine the WLAN personal access point transceiver 754 will desense the WWAN RAT WLAN receiver 752 and disable communication with the WWAN RAT WLAN base station when the WLAN personal access point transceiver 754 desenses WWAN RAT WLAN receiver 752. Additionally, the WWAN RAT WLAN can desense WLAN frequency-based network personal access point signals when the WLAN frequency-based network personal access point desenses WWAN RAT WLAN signals. For example, the WLAN frequency-based network personal access point can be set to 5 GHz and the WLAN RAT WLAN can then be shut off Once the personal access point WLAN channel is selected, the controller 720 can activate the WLAN personal access point transceiver 754 using the selected personal access point WLAN channel.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. A method in a device, the method comprising:
operating the device on a wireless wide area network channel using a wireless wide area network transceiver via a wireless wide area network radio access technology base station using a wireless wide area network radio access technology;
communicating, by the device, with a wireless wide area network radio access technology wireless local area network base station using the wireless wide area network radio access technology via a wireless wide area network radio access technology wireless local area network receiver of the device on a wireless wide area network radio access technology wireless local area network channel operating on a wireless local area network frequency; and
selecting, by the device, a personal access point wireless local area network channel of a wireless local area network frequency-based personal access point that provides the least desense of the wireless wide area network radio access technology wireless local area network channel on the wireless wide area network radio access technology wireless local area network receiver, where the wireless local area network frequency-based personal access point uses a wireless local area network personal access point transceiver on the device.

2. The method according to claim 1, further comprising:
determining whether the wireless local area network frequency-based personal access point operates on a frequency outside of wireless wide area network radio access technology wireless local area network channel frequencies; and
disabling communication with the wireless wide area network radio access technology wireless local area network base station when the wireless local area network frequency-based personal access point does not operate on a frequency outside of wireless wide area network radio access technology wireless local area network channel frequencies.

3. The method according to claim 1,
wherein the wireless wide area network radio access technology wireless local area network channel operates in a 5 GHz band, and
wherein selecting a personal access point wireless local area network channel of the wireless local area network frequency-based network personal access point that provides the least desense of the wireless wide area network radio access technology wireless local area network channel on the wireless wide area network radio access technology wireless local area network receiver comprises selecting a 2.4 GHz band channel as the personal access point wireless local area network channel.

4. The method according to claim 1,
wherein the wireless wide area network radio access technology wireless local area network channel operates in a 5 GHz band, and
wherein selecting a personal access point wireless local area network channel of the wireless local area network frequency-based network personal access point that provides the least desense of the wireless wide area network radio access technology wireless local area network channel on the wireless wide area network radio access technology wireless local area network receiver comprises selecting an available 5 GHz band channel as the personal access point wireless local area network channel that is farthest away from the wireless wide area network radio access technology wireless local area network channel in the 5 GHz band.

5. The method according to claim 1, further comprising activating the wireless local area network personal access point transceiver using the selected personal access point wireless local area network channel.

6. The method according to claim 1, wherein communicating comprises receiving carrier aggregated data on a combination of the wireless wide area network channel and the wireless wide area network radio access technology wireless local area network channel.

7. The method according to claim 1, wherein the wireless wide area network comprises a long term evolution-based network and the personal access point wireless local area network channel comprises an 802.11 channel.

8. The method according to claim 1, wherein the wireless local area network frequency comprises a frequency in a range of 4,915 MHz to 5,925 MHz.

9. The method according to claim 1, wherein the wireless wide area network radio access technology wireless local area network base station using the wireless wide area network radio access technology and the wireless wide area network base station using the wireless wide area network radio access technology are base stations of a same service provider.

10. The method according to claim 1, wherein a wireless local area network frequency-based personal access point comprises at least one selected from a mobile hot spot and a peer-to-peer group organizer.

11. A device comprising:
a wireless wide area network transceiver that operates the device on a wireless wide area network channel via a wireless wide area network radio access technology base station using a wireless wide area network radio access technology;
a wireless wide area network radio access technology wireless local area network receiver that communicates with a wireless wide area network radio access technology wireless local area network base station using the wireless wide area network radio access technology on a wireless wide area network radio access technology wireless local area network channel operating on a wireless local area network frequency;
a wireless local area network frequency-based personal access point transceiver; and
a controller coupled to the wireless wide area network transceiver, the wireless wide area network radio access technology wireless local area network receiver, and the wireless local area network personal access point transceiver, where the controller selects a personal access point wireless local area network channel of the wireless local area network frequency-based personal access point transceiver that provides the least desense of the wireless wide area network radio access technology wireless local area network channel on the wireless wide area network radio access technology wireless local area network receiver.

12. The device according to claim 11, wherein the controller determines whether the wireless local area network frequency-based personal access point transceiver operates on a frequency outside of wireless wide area network radio access technology wireless local area network channel frequencies and disables communication with the wireless wide area network radio access technology wireless local area network base station when the wireless local area network frequency-based personal access point transceiver does not operate on a frequency outside of wireless wide area network radio access technology wireless local area network channel frequencies.

13. The device according to claim 11,
wherein the wireless wide area network radio access technology wireless local area network channel operates in a 5 GHz band, and
wherein the controller selects a personal access point wireless local area network channel of the wireless local area network frequency-based network personal access point that provides the least desense of the wireless wide area network radio access technology wireless local area network channel on the wireless wide area network radio access technology wireless local area network receiver by selecting a 2.4 GHz band channel as the personal access point wireless local area network channel.

14. The device according to claim 11,
wherein the wireless wide area network radio access technology wireless local area network channel operates in a 5 GHz band, and
wherein the controller selects a personal access point wireless local area network channel of the wireless local area network frequency-based network personal access point that provides the least desense of the wireless wide area network radio access technology wireless local area network channel on the wireless wide area network radio access technology wireless local area network receiver by selecting an available 5 GHz band channel as the personal access point wireless local area network channel that is farthest away from the wireless wide area network radio access technology wireless local area network channel in the 5 GHz band.

15. The device according to claim 11, wherein the controller activates the wireless local area network personal access point transceiver using the selected personal access point wireless local area network channel.

16. The device according to claim 11, wherein wireless wide area network radio access technology wireless local area network receiver communicates with the wireless wide area network radio access technology wireless local area network base station by receiving carrier aggregated data by aggregating data received via the wireless wide area network radio access technology wireless local area network receiver and on the wireless wide area network radio access technology wireless local area network channel with data received via the wireless wide area network transceiver on the wireless wide area network channel.

17. The device according to claim 11, wherein the wireless wide area network comprises a long term evolution-based network and the personal access point wireless local area network channel comprises an 802.11 channel.

18. The device according to claim 11, wherein the wireless local area network frequency comprises a frequency in a range of 4,915 MHz to 5,925 MHz.

19. The device according to claim 11, wherein the wireless wide area network radio access technology wireless local area network base station using the wireless wide area network radio access technology and the wireless wide area network base station using the wireless wide area network radio access technology are base stations of a same service provider.

20. The device according to claim 11, wherein a wireless local area network frequency-based personal access point comprises at least one selected from a mobile hot spot and a peer-to-peer group organizer.

* * * * *